(12) United States Patent
Cook

(10) Patent No.: US 10,941,569 B2
(45) Date of Patent: Mar. 9, 2021

(54) CLIP HANGER AND CEILING SUSPENSION SYSTEM INCORPORATING SAME

(71) Applicant: Andrew Cook, Fort Erie (CA)

(72) Inventor: Andrew Cook, Fort Erie (CA)

(*) Notice: Subject to any disclaimer, the term of this patent is extended or adjusted under 35 U.S.C. 154(b) by 0 days.

(21) Appl. No.: 16/710,908

(22) Filed: Dec. 11, 2019

(65) Prior Publication Data

US 2020/0190798 A1 Jun. 18, 2020

Related U.S. Application Data

(60) Provisional application No. 62/778,453, filed on Dec. 12, 2018.

(51) Int. Cl.
| | |
|---|---|
| *E04B 9/18* | (2006.01) |
| *E04B 9/10* | (2006.01) |
| *E04B 9/04* | (2006.01) |
| *F16M 13/02* | (2006.01) |

(52) U.S. Cl.
CPC ............ *E04B 9/183* (2013.01); *E04B 9/04* (2013.01); *E04B 9/10* (2013.01); *F16M 13/027* (2013.01)

(58) Field of Classification Search
CPC . E04B 9/18; E04B 9/225; E04B 9/345; E04B 9/127; E04B 9/067; E04B 9/068; E04B 9/20; E04B 9/006; E04B 9/183; E04B 9/10; E04B 9/12; F16M 13/027
See application file for complete search history.

(56) References Cited

U.S. PATENT DOCUMENTS

| | | | | |
|---|---|---|---|---|
| 2,841,255 A * | 7/1958 | Kemp | ........... | E04B 9/0485 |
| | | | | 52/395 |
| 2,942,704 A * | 6/1960 | Stubbs | ........... | E04B 9/32 |
| | | | | 52/476 |
| 3,017,973 A * | 1/1962 | Schwartz | ........... | E04B 9/345 |
| | | | | 52/656.8 |
| 3,035,672 A * | 5/1962 | Tuten | ........... | E04B 9/04 |
| | | | | 52/656.8 |
| 3,084,893 A * | 4/1963 | Ruth | ........... | E04B 9/18 |
| | | | | 248/228.4 |

(Continued)

FOREIGN PATENT DOCUMENTS

| | | | | |
|---|---|---|---|---|
| CA | 2518294 A1 * | 3/2006 | ........... | E04B 9/127 |
| CA | 2991355 A1 * | 9/2018 | ........... | E04B 9/067 |

(Continued)

*Primary Examiner* — Jessie T Fonseca
(74) *Attorney, Agent, or Firm* — Kinney & Lange, P.A.

(57) ABSTRACT

A hanger and a ceiling suspension system incorporating the hanger, for suspending a suspension rail from a ceiling are provided, where the suspension rail is configured to support an object. The hanger includes a first suspension member and a second suspension member positioned adjacent to one another. The first and second suspension members each have an upper portion, a lower portion, and a coupling component situated between the upper and lower portions. The upper portions are configured to be releasably suspended from the ceiling. The lower portions are configured to releasably engage the suspension rail. The coupling components are engageable to form a hinge connection between the first and second suspension members. Separation of the upper portions from one another biases the lower portions towards one another to releasably engage the suspension rail between the suspension members.

15 Claims, 10 Drawing Sheets

(56) References Cited

U.S. PATENT DOCUMENTS

| | | | | |
|---|---|---|---|---|
| 3,089,570 A * | 5/1963 | O'Neil, Jr. | ............... | E04B 9/14 52/713 |
| 3,275,817 A * | 9/1966 | Schwartz | ............... | F21V 21/00 52/28 |
| 3,323,582 A * | 6/1967 | Armstrong | ............. | E04B 9/067 165/49 |
| 3,334,197 A * | 8/1967 | Boden | .................... | H02G 5/04 191/40 |
| 3,599,921 A * | 8/1971 | Cumber | ................. | E04B 9/006 248/317 |
| 3,612,461 A * | 10/1971 | Brown | ..................... | E04B 9/18 248/317 |
| 3,816,880 A * | 6/1974 | Jacobs | .................. | F21V 21/04 362/150 |
| 3,843,086 A * | 10/1974 | Ptak | ...................... | E04B 9/006 248/317 |
| 3,969,865 A * | 7/1976 | Andersen | ............... | E04B 9/068 52/506.07 |
| 4,479,341 A * | 10/1984 | Schuplin | ................ | E04B 9/127 52/506.07 |
| 4,583,340 A * | 4/1986 | Sauer | .................... | E04B 9/127 52/506.07 |
| 4,610,562 A * | 9/1986 | Dunn | ..................... | E04B 9/18 403/191 |
| 4,720,946 A * | 1/1988 | Pagliarello | ............. | E04B 9/22 52/127.7 |
| 5,077,951 A * | 1/1992 | Baker | ................... | E04B 9/0478 52/106 |
| 5,279,090 A * | 1/1994 | Yamaguchi | ............... | E04B 9/02 454/187 |
| 5,349,800 A * | 9/1994 | Peng | ...................... | E04B 9/127 403/174 |
| 7,374,057 B2 * | 5/2008 | Hendrickson | ............ | H02G 3/20 174/50 |
| D638,289 S * | 5/2011 | Tedesco | ........................ | D8/394 |
| 10,010,731 B1 * | 7/2018 | Beagen | .................. | A62C 35/68 |
| 2002/0060280 A1 * | 5/2002 | Yaphe | ...................... | E04B 9/006 248/317 |
| 2007/0180787 A1 * | 8/2007 | Fecska | ...................... | E04H 9/02 52/506.06 |
| 2008/0060306 A1 * | 3/2008 | Platt | ........................ | E04B 9/122 52/506.06 |
| 2012/0017531 A1 * | 1/2012 | Bankston | ................ | E04B 9/127 52/506.05 |
| 2013/0167465 A1 * | 7/2013 | Santeramo | ................ | E04B 9/10 52/506.07 |
| 2014/0090211 A1 * | 4/2014 | Kalman | ................... | F16B 2/10 24/489 |
| 2019/0072249 A1 * | 3/2019 | Bobbo | .................... | E04B 9/006 |

FOREIGN PATENT DOCUMENTS

| | | | | |
|---|---|---|---|---|
| DE | 29721485 U1 * | 1/1998 | ............... | E04B 9/20 |
| EP | 2559823 A1 * | 2/2013 | ............... | E04B 9/18 |
| FR | 2274867 A1 * | 1/1976 | ............... | F21V 21/04 |
| WO | WO-2005076792 A2 * | 8/2005 | ............... | E04B 9/127 |
| WO | WO-2018218312 A1 * | 12/2018 | ............... | E04B 9/18 |
| WO | WO-2018233500 A1 * | 12/2018 | ............... | E04B 9/22 |

\* cited by examiner

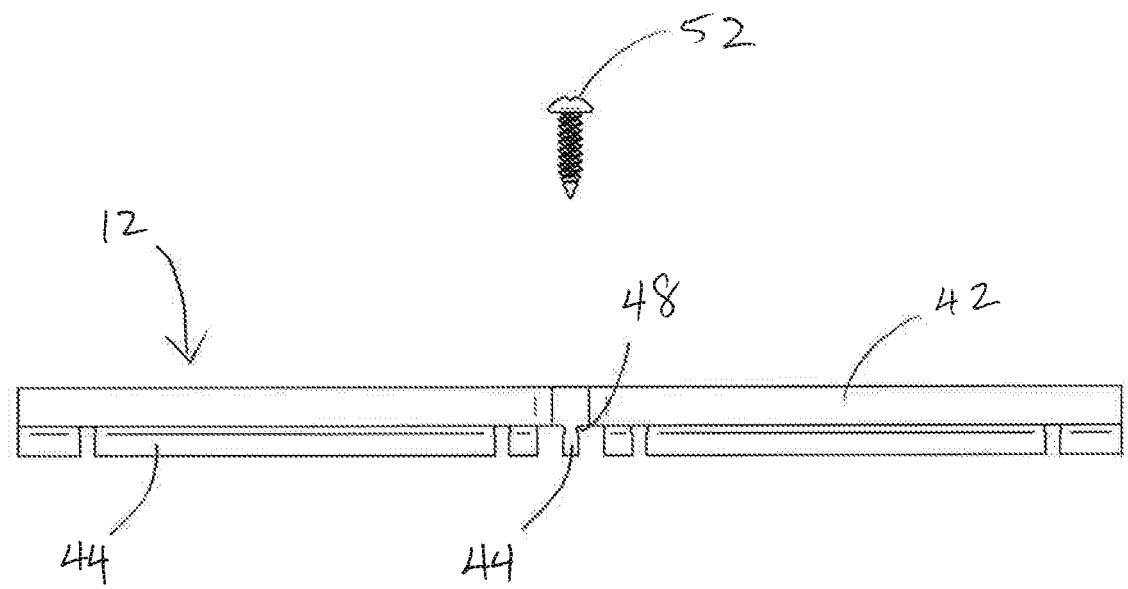
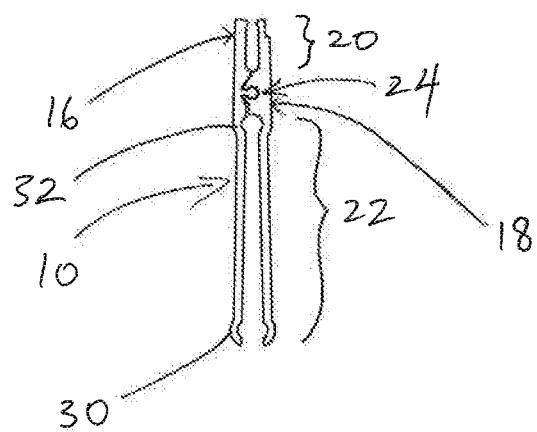
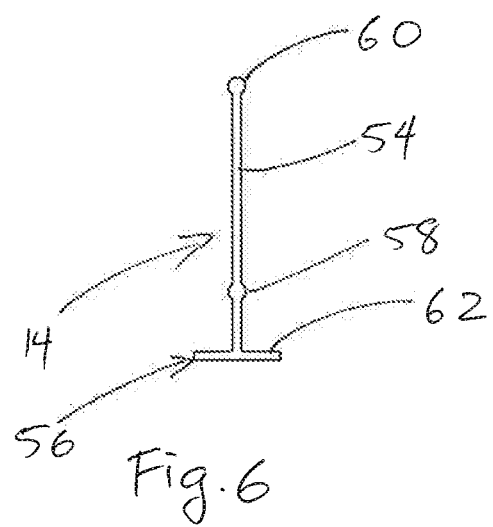
Fig. 6

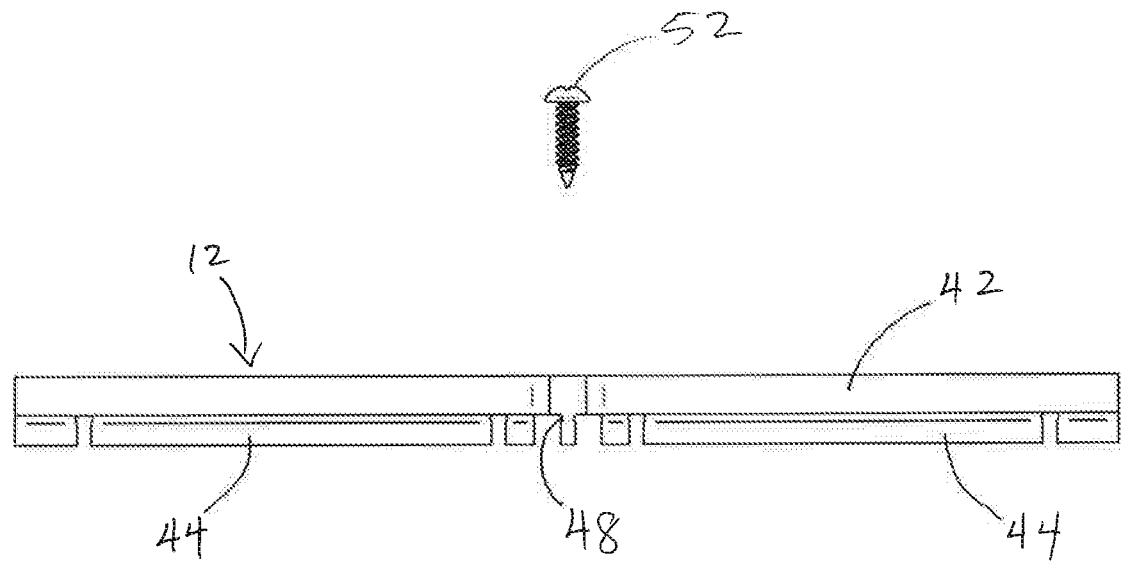
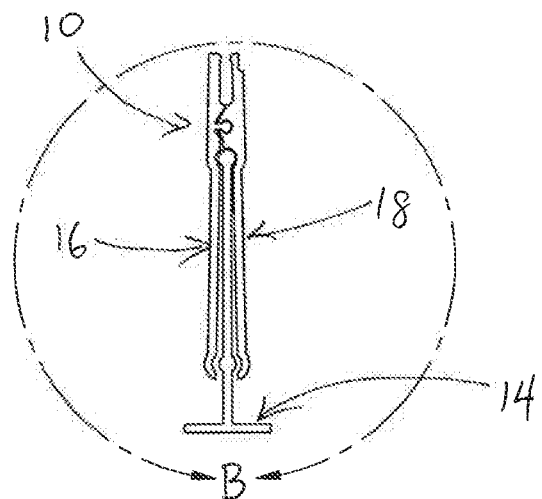
Fig. 7

CLIP HANGER AND CEILING SUSPENSION SYSTEM INCORPORATING SAME

FIELD

This disclosure relates generally to a ceiling suspension system and a hanger for suspending an object from a ceiling or deck via the suspension system.

BACKGROUND

Suspension systems for suspending ceiling tiles and other objects from a ceiling or deck may employ T-bars or rails to hold or suspend the tiles or objects in place. Commonly, the ceiling tiles in a suspended ceiling rest with their edges in contact with a lateral flange or a T-bar rail such that all four sides of a typical rectangular tile are framed by the T-bar. Where a ceiling tile has a side that is adjacent to a wall, an L-bracket fixed to the wall surface, replaces the T-bar along the wall side of the tile. Conventionally, installers need to cut and connect the trim members or T-bars during installation if different geometric effects/configurations are desired.

As is also typically the case with suspended ceiling systems, lighting devices, sprinklers, HVAC registers, and other fixtures are often integrated into the ceiling so the light, water, or airflow etc. from the fixture has access to the room below. In this manner, the surface area of known components of suspended ceiling systems, situated above the fixtures, need not be minimized to reduce their obstruction of light, water or airflow from the fixtures. However, the fixture is then commonly visible to an individual in the room.

SUMMARY

The present disclosure, therefore, provides a hanger for suspending a suspension rail from a ceiling, the suspension rail configured to support an object, the hanger comprising: a first suspension member and a second suspension member positioned adjacent to one another, the first and second suspension members each having: an upper portion, a lower portion, and a coupling component situated between the upper and lower portions, the upper portions configured to be releasably suspended from the ceiling, the lower portions configured to releasably engage the suspension rail, and the coupling components engageable to form a hinge connection between the first and second suspension members; wherein separation of the upper portions from one another biases the lower portions towards one another to releasably engage the suspension rail between the suspension members.

In another aspect there is provided a ceiling suspension system for suspending an object from a ceiling, the suspension system comprising: a mounting bracket securable to the ceiling, the mounting bracket having a flange extending therefrom and an aperture extending through the flange; a suspension rail configured to support the object, the suspension rail having a vertical web; and a first suspension member and a second suspension member positioned adjacent to one another, the first and second suspension member each having: an upper portion, a lower portion, and a coupling component situated between the upper and lower portions, the upper portions configured to be engagable with the flange of the mounting bracket for suspension therefrom, the lower portions configured to be engagable with the vertical web of the suspension rail for suspension therefrom, and the coupling components being engageable to form a hinge connection between the first and second suspension members, and a fastener directed through the aperture in the mounting bracket for securing the suspension members to the mounting bracket, wherein engagement of the flange between the upper portions separates the upper portions from one another, thereby biasing the lower portions together to releasably engage the vertical web and suspend the suspension rail therefrom.

Further aspects of the present disclosure will become apparent from the following description taken together with the accompanying drawings.

BRIEF DESCRIPTION OF THE DRAWINGS

For a better understanding of the present disclosure, and to show more clearly how it may be carried into effect, reference will now be made, by way of examples, to the accompanying drawings which show exemplary embodiments of the present disclosure in which:

FIG. 6 is a partial side view of the exploded ceiling suspension system of FIG. 5.

FIG. 7 is a side view of the ceiling suspension system of FIG. 5 partially assembled.

DESCRIPTION

The present disclosure may be embodied in a number of different forms. The specification and drawings that follow describe and disclose some of the specific forms of the disclosure.

Referring to the attached drawings, FIGS. 1 to 8 show an exemplary embodiment of a hanger 10 incorporated into an exemplary embodiment of a ceiling suspension system 100 for suspending an object from a ceiling. In the depicted embodiment, ceiling suspension system 100 includes a hanger 10, a mounting bracket 12 and one or more suspension rails 14.

Figure 1:
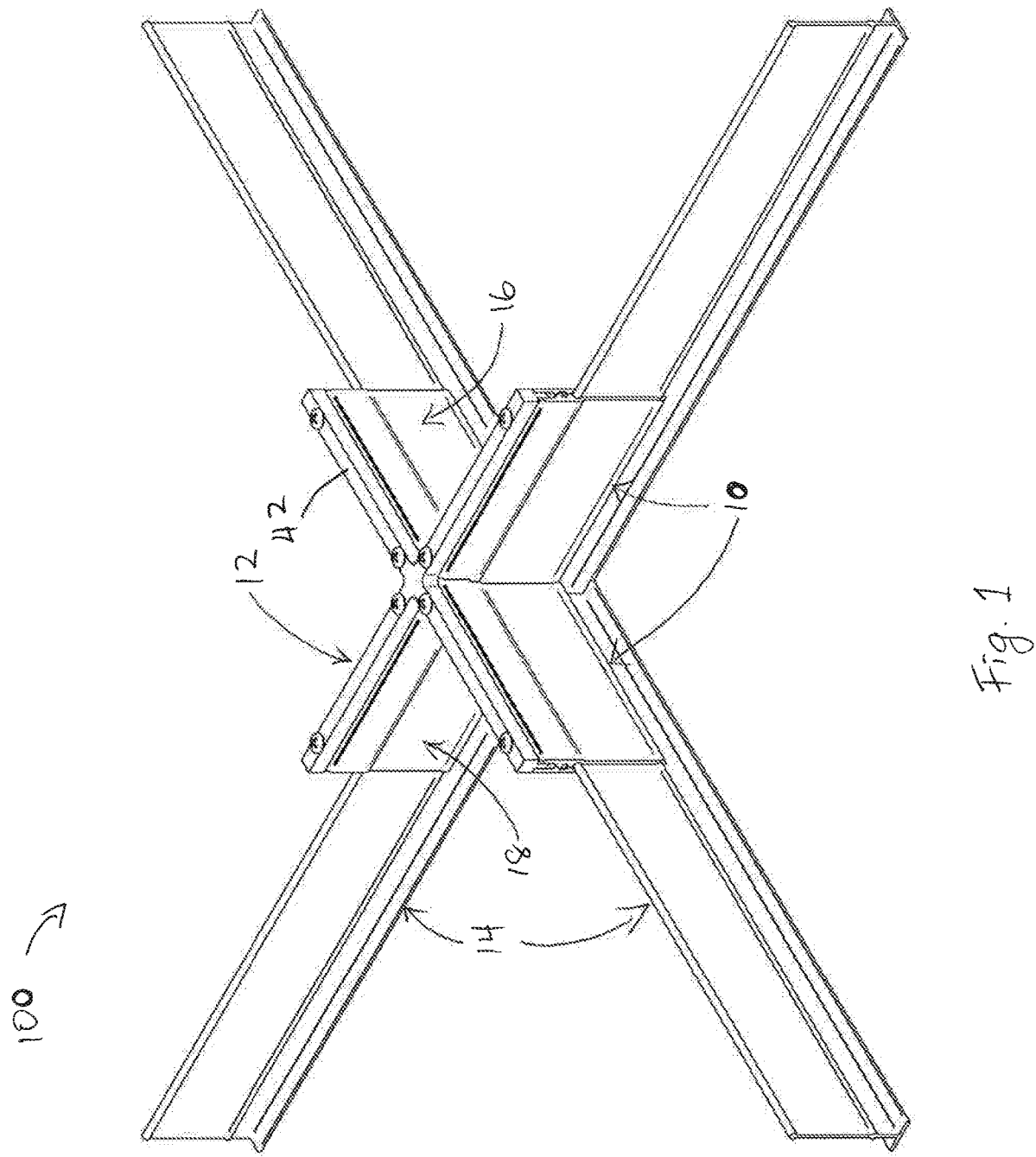
FIG. 1 is an upper perspective view of a hanger in a ceiling suspension system according to an embodiment of the present disclosure.
Figure 2:
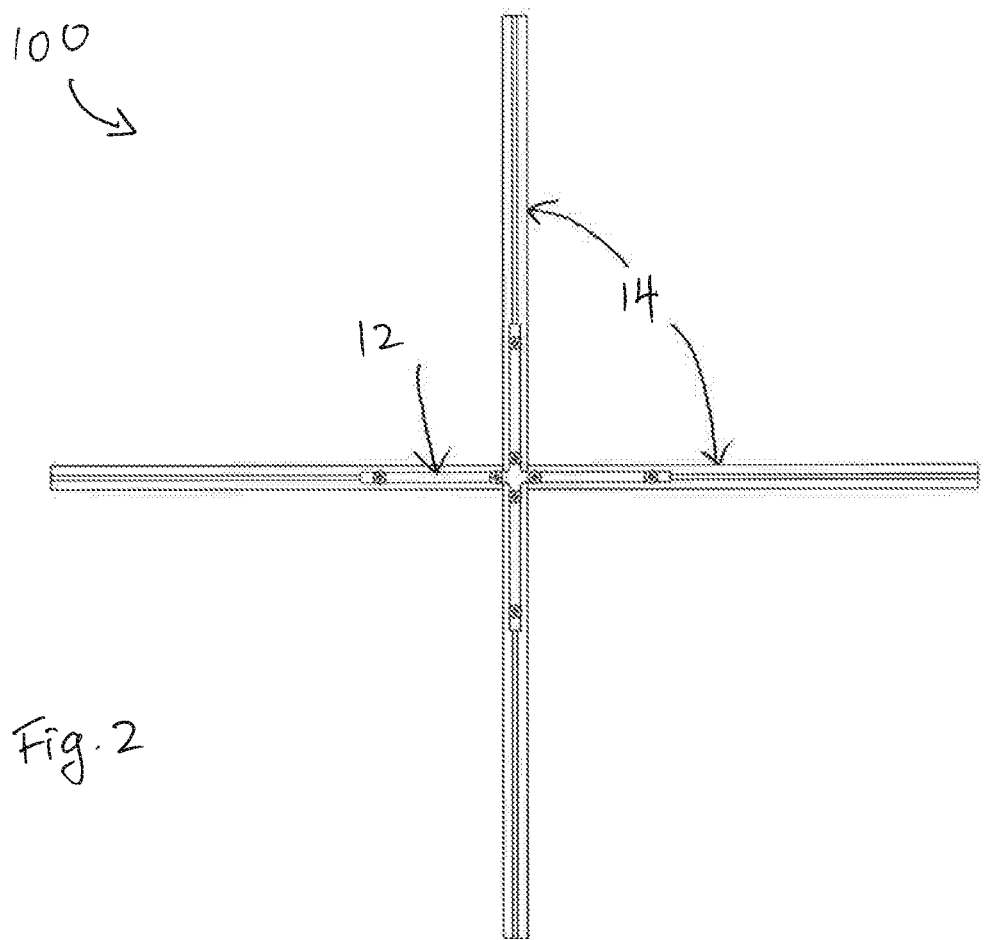
FIG. 2 is a plan view of the ceiling suspension system of FIG. 1.
Figure 3:
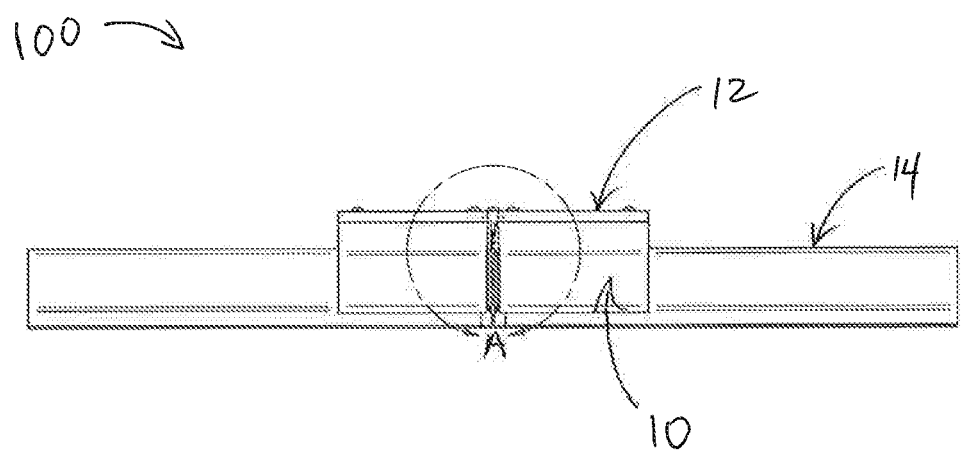
FIG. 3 is a side view of the ceiling suspension system of FIG. 1.
Figure 4:
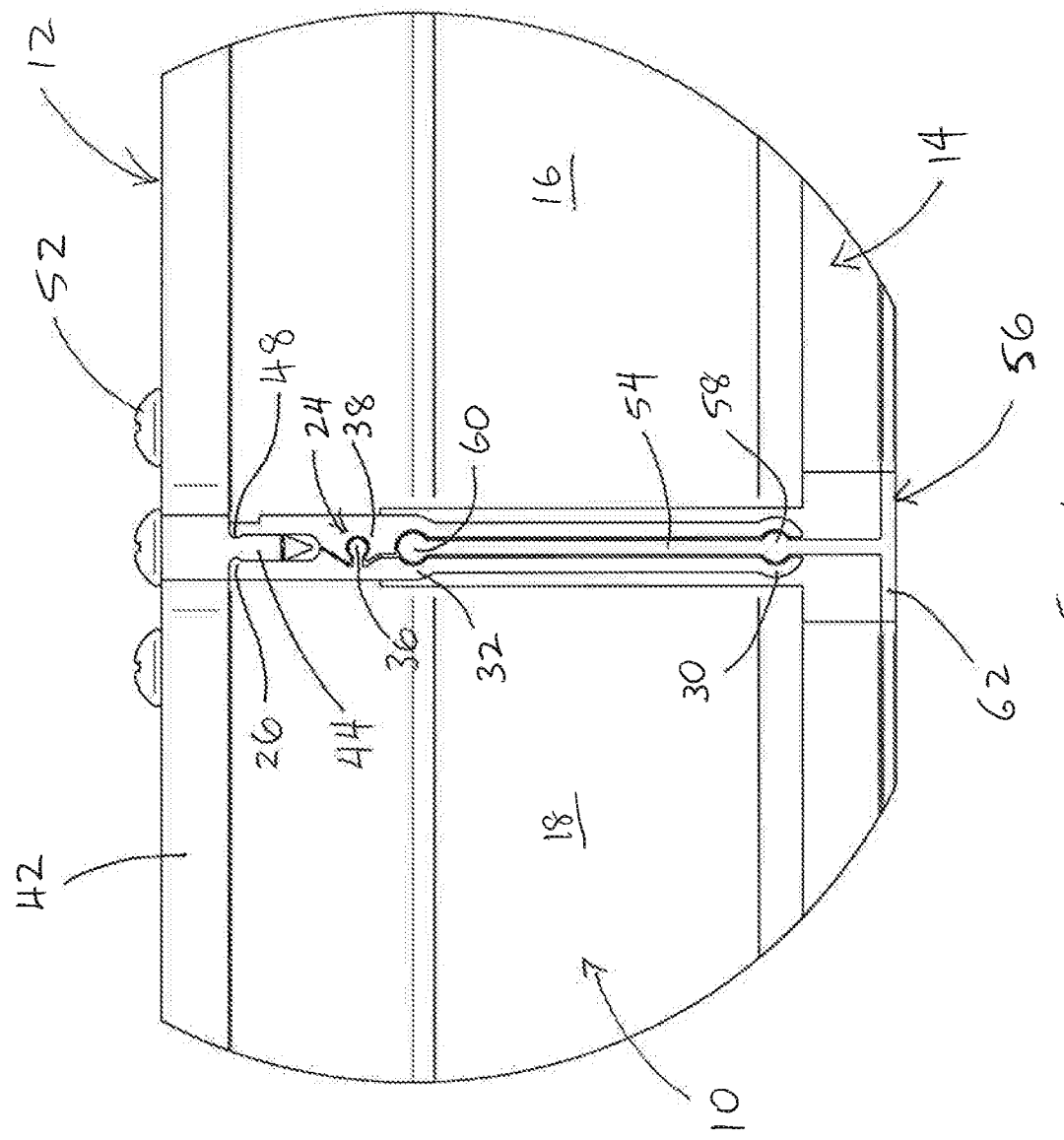
FIG. 4 is an enlarged view of portion A of FIG. 3.
Figure 5:
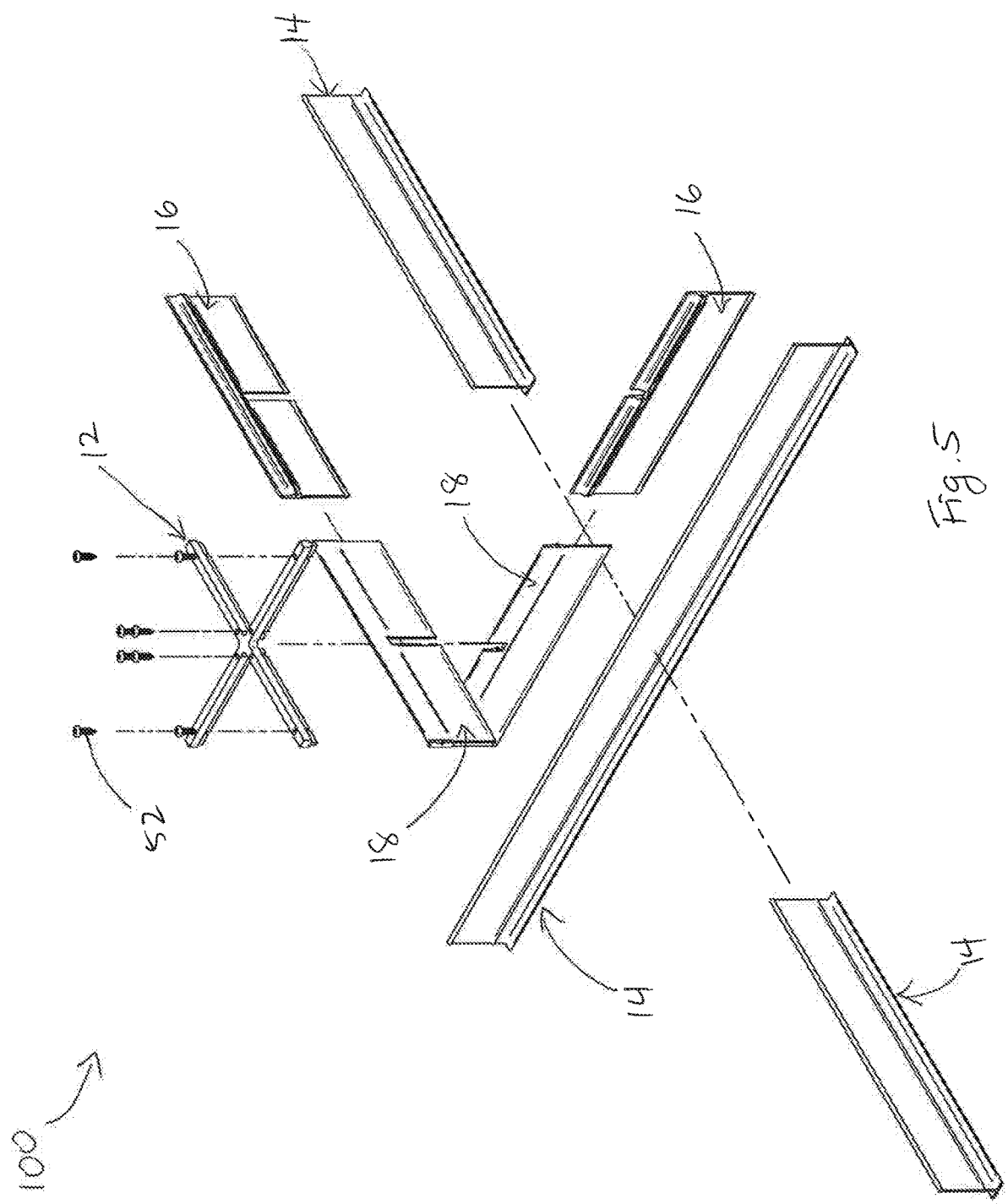
FIG. 5 is an exploded view of the ceiling suspension system of FIG. 1.
Figure 8:
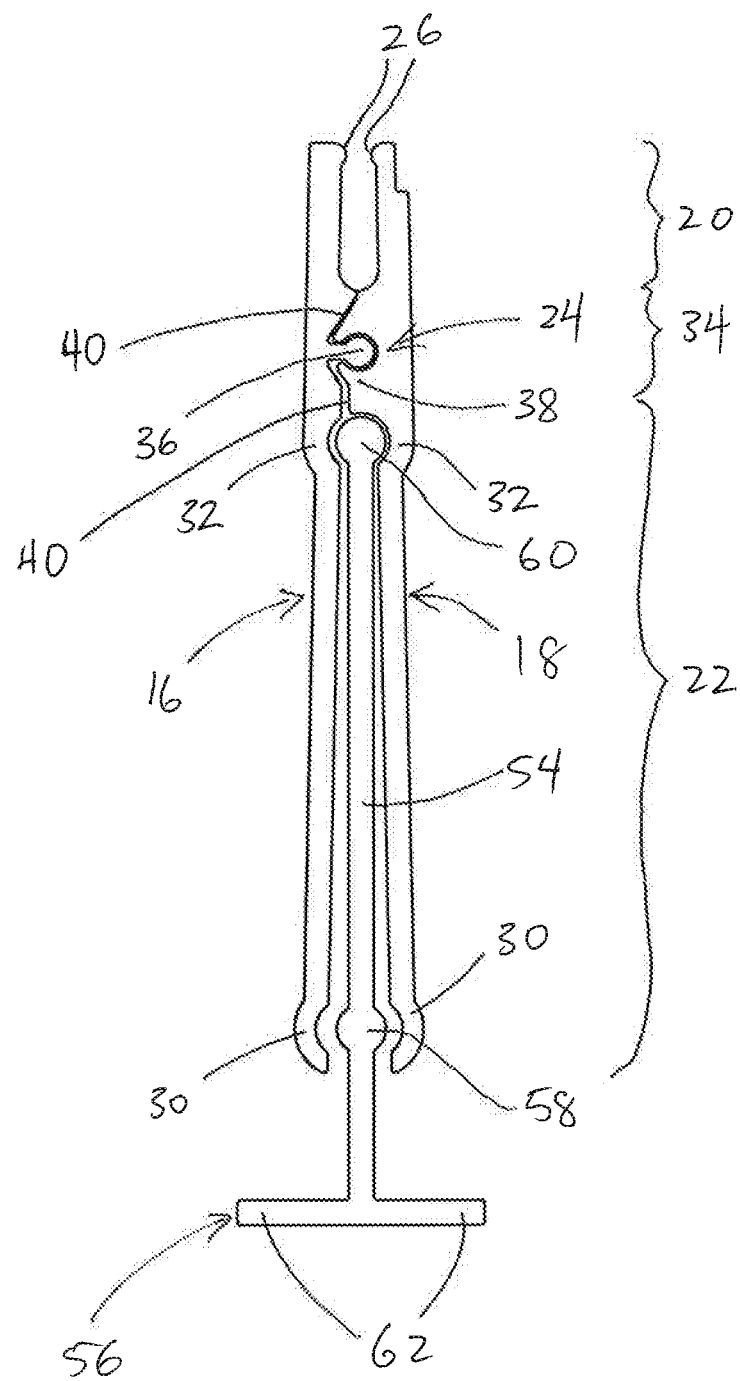
FIG. 8 is an enlarged view of portion B of FIG. 7.
Figure 10:
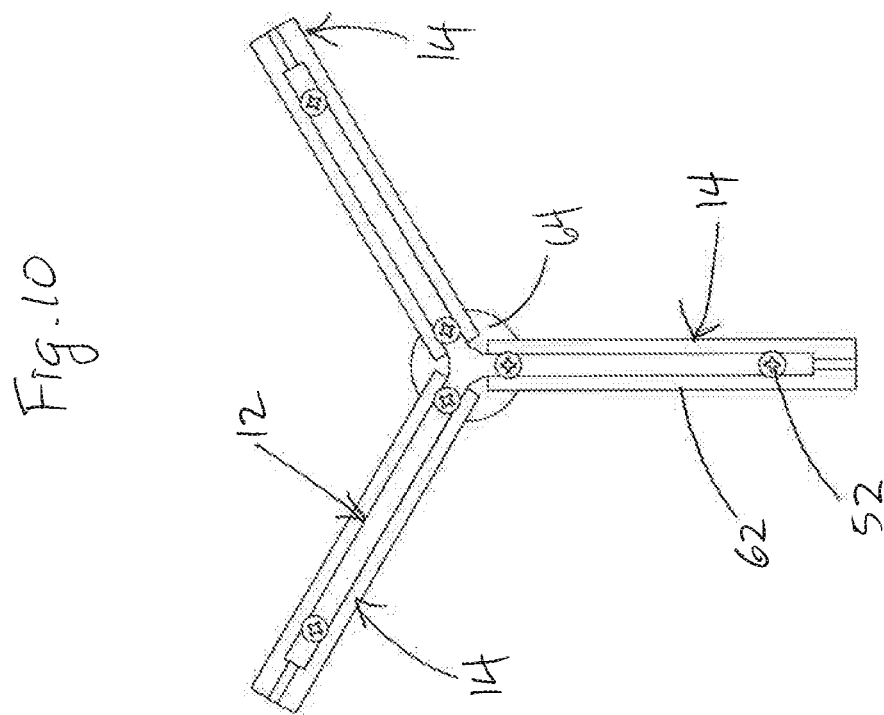
FIG. 10 is an enlarged view of portion C of FIG. 9.
Figure 9:
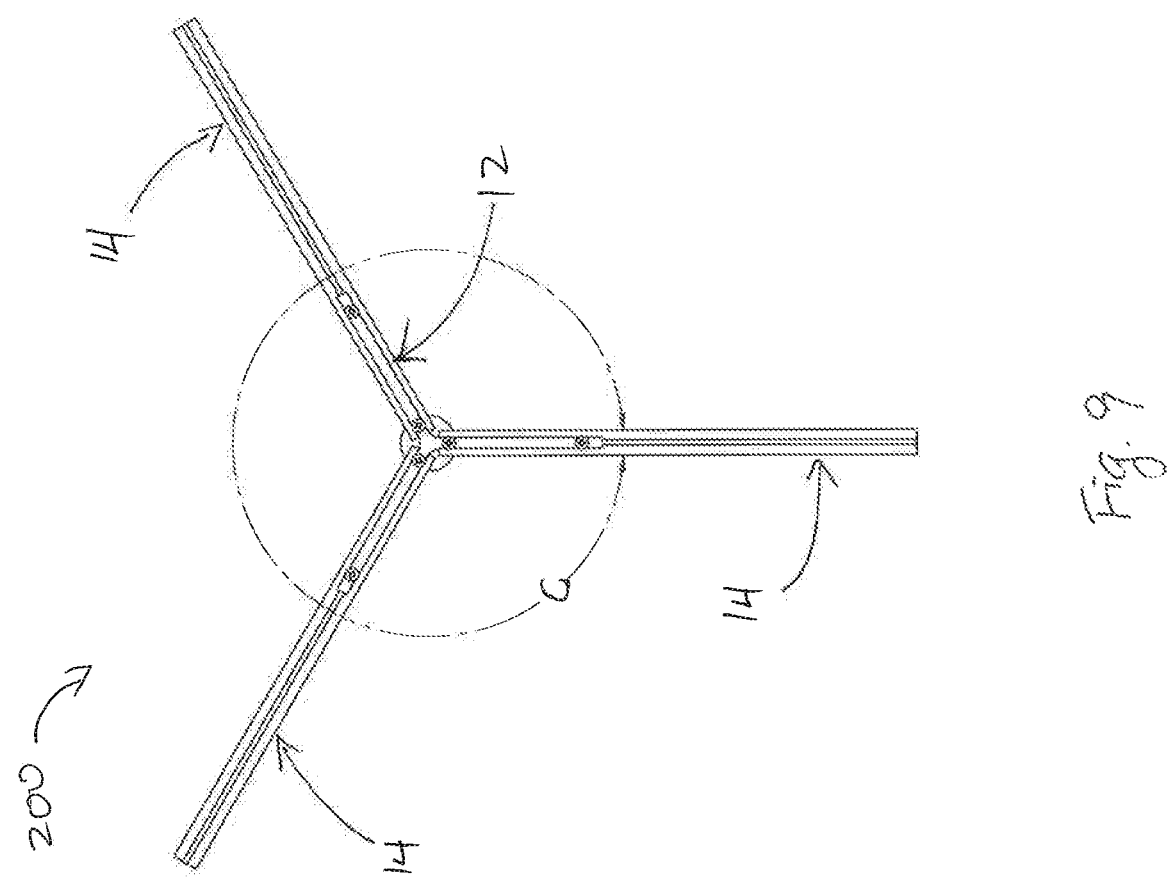
FIG. 9 is plan view of a ceiling suspension system according to another embodiment of the present disclosure.
Figure 11:
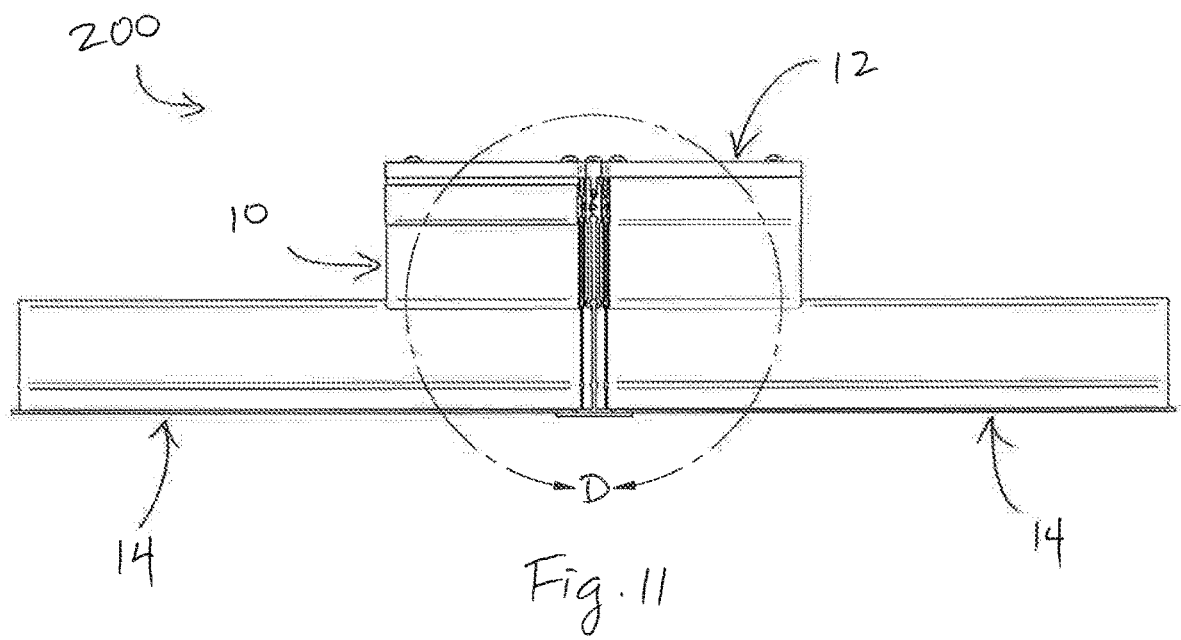
FIG. 11 is a side view of the ceiling suspension system of FIG. 9.
Figure 12:
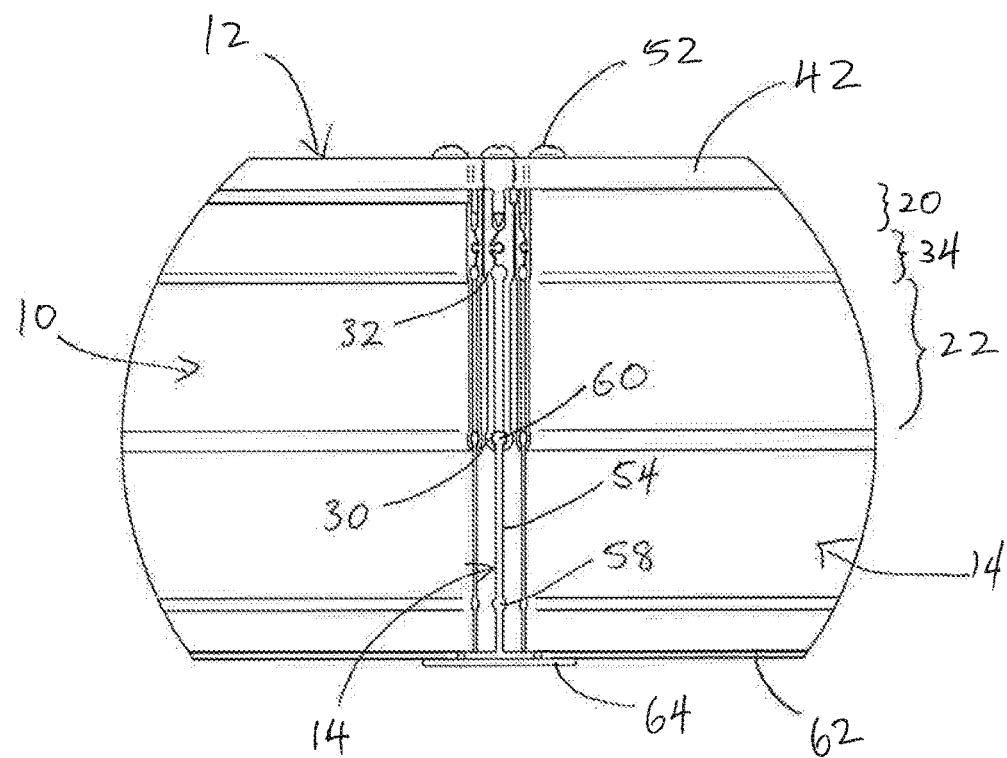
FIG. 12 is an enlarged view of portion D of FIG. 11.
Figure 13:
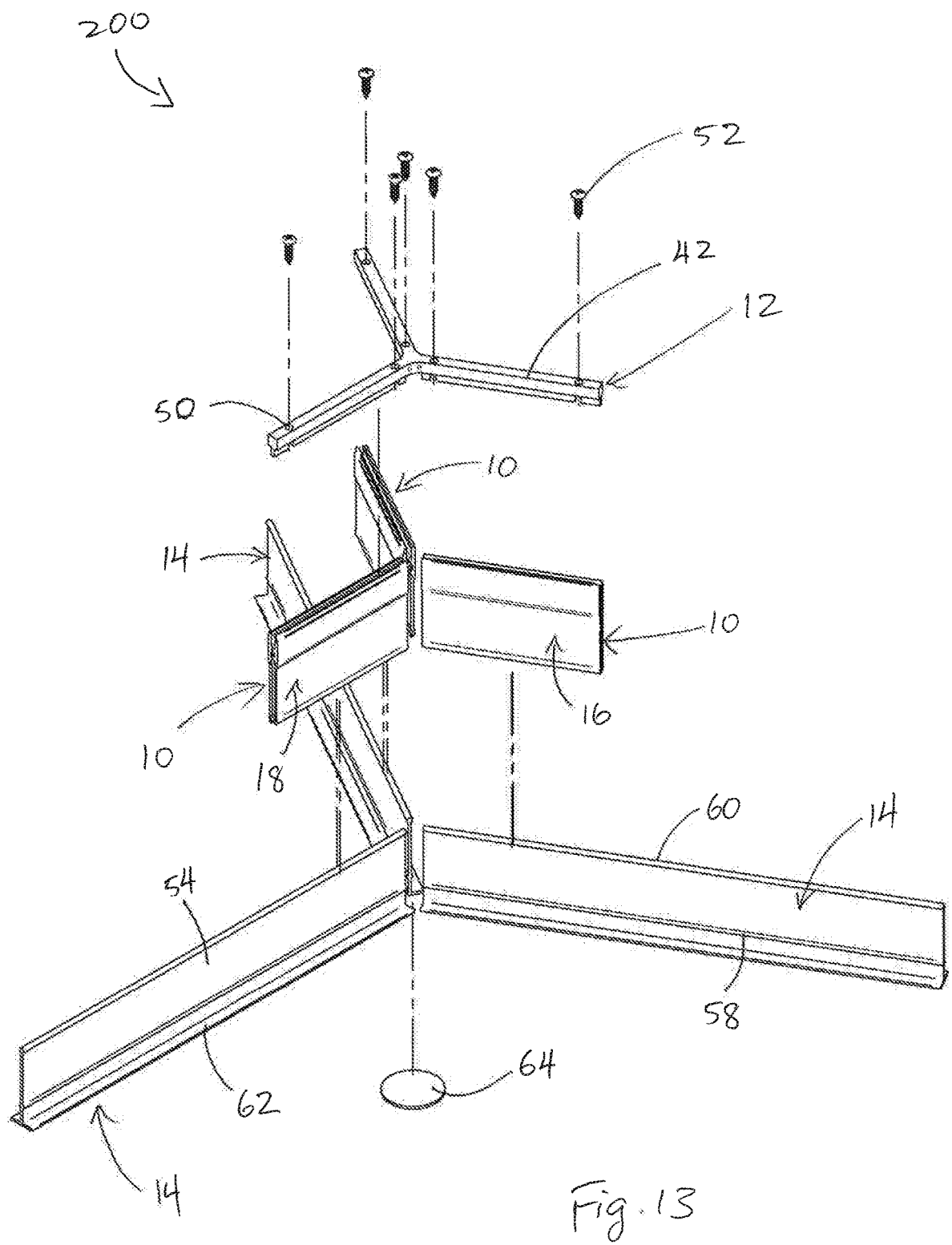
FIG. 13 is an exploded upper perspective view of the ceiling suspension system of FIG. 9.

Hanger 10, as best seen in FIGS. 6 and 8, includes a first suspension member 16 and a second suspension member 18 positioned adjacent to one another. Each suspension member 16, 18 has an upper portion 20, a lower portion 22, and a coupling component 24 situated therebetween.

Upper portions 20 are configured to be suspended from the ceiling. For example, at least one of upper portions 20 may include a lip 26 positioned to releasably engage mounting bracket 12, which is securable to the ceiling. In the embodiment depicted, both upper portions 20 have lips 26 situated internally at their outer ends. Lips 26 may then releasably engage mounting bracket 12, which in turn is securable to the ceiling. While lips 26 are shown to longitudinally extend along the outer end of upper portions 20, one or both of lips 26 may instead be spaced apart from its respective outer end. In other applications, each upper portion 20 may include more than one lip 26.

Lower portions 22 are configured to releasably engage suspension rail 14. For example, at least one of the lower portions 22 of suspension members 16, 18 forms a first groove 30. As best seen in FIG. 8, both of the lower portions 22 include first groove 30, which is positioned for releasably engaging suspension rail 14. As shown, first groove 30 is positioned at the outer end of lower portion 22.

Lower portions 22 of this embodiment may also include a second groove 32, that is positioned between first groove 30 and coupling components 24, also for releasably engaging suspension rail 14. Here, second groove 32 is positioned adjacent coupling components 24. As readily understood by the skilled person, first and second grooves 30, 32 may be positioned at any point along lower portions 22. Lower portions 22 may also include grooves in addition to first and second grooves 30, 32. Alternatively, the grooves on lower portions 22 may have a different cross-sectional shape (other than circular as shown).

Coupling components 24 are engageable to form a hinge connection 34 between first and second suspension members 16, 18. In this manner, separation of upper portions 20 from one another biases lower portions 22 towards one another to releasably engage, and suspend, suspension rail 14 from suspension members 16, 18. In turn, suspension rail 14 supports an object (tile) in spaced relationship from the ceiling.

In the depicted embodiment, coupling components 24 comprise a ball 36 extending from first suspension member 16 and a socket 38 within second suspension member 18. When ball 36 is received within socket 38, a hinge connection 34, similar to a clothespin or clip, is created. As best seen in FIG. 8, when ball 36 is received within socket 38, hinge connection 34 further includes a gap 40 flanking hinge connection 34 between first and second suspension members 16, 18. Gap 40 allows for the rotational movement of ball 36 relative to socket 38 when upper portions 20 are pinched or pressed together and/or when upper portions 20 are pushed apart.

Alternatively, rather than a ball and socket connection, coupling components 24 may instead be a barrel and a pin (not shown) secured to first and second suspension members 16, 18. A gap would also be present in such an application to allow for the rotational movement of the pin relative to the barrel when upper portions 20 are pinched or pressed together. As understood by the skilled person, coupling components 24 may be other mechanisms that form hinge connection 34 between first and second suspension members 16, 18.

As mentioned, ceiling suspension system 100 may include a mounting bracket 12 along with hanger 10. Mounting bracket 12 has a bracket body 42 and a flange 44 extending therefrom. In the depicted embodiment, bracket body 42 is a cross-shaped bracket with flanges 44 extending longitudinally along each of its arms.

As best seen in FIGS. 6 and 7, flange 44 has at least one indentation 48 for coupling with one of first and second suspension members 16 and 18. In the depicted embodiment, two indentations 48 are shown running along either side of flange 44 adjacent to bracket body 42. In other embodiments, flange 44 may have three or more indentations 48. The indentations may also, or instead, be spaced apart from bracket body 42 on flange 44.

Indentations 48 are situated on flange 44 to correspond with and receive lips 26 on upper portions 20 of suspension members 14, 16. In particular, receipt of lips 26 in indentations 48 allow upper portions 20 to grip flange 44, thus aiding in suspending suspension members 16, 18 from mounting bracket 12. Further, the situation of flange 44 between upper portions 20 separate the upper portions from one another. Given hinge connection 34 position between upper ad lower portions 20, 22, lower portions 22 are thus biased towards one another to releasably engage, and suspend, suspension rail 14 therefrom.

In an alternative example, not shown, rather than indentation 48 being situated on flange 44 with lips 26 situated on upper portions 20, indentation 48 may instead be situated on upper portions 20 while lips 26 may be situated on flange 44. In a similar manner, receipt of lips 26 in indentations 48 allows upper portions 20 to grip flange 44, thus aiding in suspending suspension members 16, 18 from mounting bracket 12.

Mounting bracket 12 further includes an aperture 50 extending through flange 44 towards suspension members 16, 18. Aperture 50 is dimensioned to receive a fastener 52 therethrough for securing mounting bracket 12 to suspension members 16, 18.

In the depicted embodiment, receipt of fastener 52 through aperture 50 also positions the barrel portion of fastener 52 between upper portions 20 of first and second suspension members 16, 18. The presence of the barrel of fastener 52 between upper portions 20 can also aid in separating upper portions 20 from one another and help to bias lower portions 22 towards one another.

Mounting bracket 12 may be secured to the ceiling in a manner known in the art.

As shown, ceiling suspension system 100 may include suspension rails 14, which are configured to support an object, such as a ceiling tile. Suspension rails 14 have a vertical web 54 and a connector 56 situated at an end of vertical web 54. As noted above, lower portions 22 of hanger 10 are configured to releasably engage vertical web 54 of suspension rails 14 when upper portions 20 are biased away from one another. Suspension rail 14, in turn, supports the object in spaced relationship from the ceiling through connector 56.

Vertical web 54 includes a first ridge 58 extending longitudinally along vertical web 54. A ridge 58 may be positioned on each side of web 54. First ridge 58 is positioned to correspond with first groove 30 on lower portions 22. First groove 30 is thus positioned to receive first ridge 58 situated on suspension rail 14.

Vertical web 54 may further includes a second ridge 60 positioned to releasably engage with second groove 32 on lower portions 22. Second ridge 60 is situated at an end of vertical web 54 opposite connector 56. A pair of ridges 60 may be utilized with a ridge on each side of web 54. Alternatively, ridge 60 could have a generally circular cross-section and extend along both sides of the end of web 54. First ridge 58 is positioned between second ridge 60 and connector 56. Similar to first and second grooves 30, 32 discussed above, first and second ridges 58, 60 may alternatively be positioned at any point along vertical web 54, so long as they are positioned to correspond, respectively, with first and second grooves 30, 32 for releasable engagement therefrom.

Accordingly, when upper portions 20 are biased away from one another, lower portions 22 are biased together such that first and second grooves 30, 32 respectively grip first and second ridges 58, 60, thereby releasably engaging vertical web 54 of suspension rail 14.

In an alternative example, not shown, the position of the grooves and ridges may be switched. For example, lower portions 22 may include first ridge 58, and optionally, second ridge 60, while vertical web 54 may include first groove 30, and optionally, second groove 32. In a similar manner, therefore, when upper portions 20 are biased away from one another, lower portions 22 are biased together such that first and second ridges 58, 60 respectively grip first and second grooves 30, 32, thereby releasably engaging suspension rail 14. Other manners of releasably securing the suspension rail between lower portions 22 may be used.

Connector 56 is configured to hold, support or otherwise maintain an object in spaced relationship from a ceiling or deck when ceiling suspension system is assembled. In the present application, connector 56 is a pair of ledges 62 extending away from vertical web 54. In this manner, ledges 62 may support a tile or panel in spaced relationship from the ceiling. However, connector 56 may take another form in order to support a different object from the ceiling or deck. For example, connector 56 may instead be an annular ring or tube for supporting a pipe or wiring.

FIGS. 9-13 illustrate another exemplary embodiment of a ceiling suspension system 200 in accordance with the present disclosure. Similar to suspension system 100, suspension system 200 also includes a mounting bracket 12, hangers 10 and suspension rails 14.

However, in this embodiment, mounting bracket 12 is Y-shaped. Three hangers 10 are arranged to releasably engage each flange 44 running along each arm of the Y-shaped bracket. Three suspension rails 14 are, in turn, arranged to releasably engage the three hangers 10. Since the ends of suspension rails 14 now meet at roughly 60° angles to one another, ceiling suspension system 200 further includes a trim disc 64 releasably secured to ledges 62 of the three suspension rails 14 at their point of intersection.

FIGS. 9-13 also show a different assembled arrangement than that shown in ceiling suspension system 100 discussed above. Rather than first and second grooves 30, 32 respectively gripping first and second ridges 58, 60 of vertical web 54, in ceiling suspension system 200, first groove 30 grips second ridge 60. In this manner, suspension rail 14 is releasably suspended at a greater distance from bracket body 42, and at a greater distance from the ceiling than in ceiling suspension system 100.

As understood by the skilled person, mounting bracket 12 may, instead, have a different number of spokes, have a different geometric configuration, or have a different shape altogether.

A potential advantage of the present disclosure is that the use of the present hanger and ceiling system may remove the need for installers to cut and connect the suspension rail or T-bars in the field if different effects/configurations are desired to be created. Assembling the present system, may thus help to save time, may be more easily duplicated, and may create a more uniform and consistent look across the ceiling.

Given the relatively slim profile of mounting bracket 12, hanger 10 and suspension rail 14, another potential advantage of the present disclosure is that the obstruction of light travelling past may tend to be minimized, thereby creating small, if any, shadows and allowing more light to travel through the tiles or panels.

Further, while hangers 10 have been shown to be secured to mounting bracket 12, which in turn is secured to the roof structure of the room, hangers 10 may alternatively be secured directly to the ceiling or roof of a room.

It will be appreciated by those skilled in the art that other variations of the embodiments described herein may also be practiced without departing from the scope of the invention. Other modifications are possible, as are the production of a very wide variety of products for other applications.

The invention claimed is:

1. A ceiling suspension system comprising:
a suspension rail configured to support an object, the suspension rail having a vertical web: and a hanger for suspending the suspension rail from a ceiling,
wherein the hanger comprises a first suspension member and a second suspension member positioned adjacent to one another, the first and second suspension members each having:
an upper portion,
a lower portion, and
a coupling component situated between the upper and lower portions,
the upper portions configured to be releasably suspended from the ceiling, the lower portions including a first groove positioned for releasably engaging configured to releasably engaging the suspension rail, and the coupling components engageable to form a hinge connection between the first and second suspension members, wherein at least one of the upper portions includes a lip for engagement with a mounting bracket that is securable to the ceiling;
wherein separation of the upper portions from one another biases the lower portions towards one another to releasably engage the suspension rail between the suspension members,
wherein the lower portions are configured to releasably engage the vertical web of the suspension rail when the upper portions are biased away from one another, the suspension rail in turn supporting the object in spaced relationship from the ceiling, and
wherein the vertical web includes a first ridge, the first groove on the lower portions positioned to receive the first ridge.

2. The ceiling suspension system of claim 1, wherein the coupling components comprise a ball and a socket connection.

3. The ceiling suspension system of claim 1, wherein the lower portions include a second groove positioned between the first groove and the coupling components for releasably engaging the suspension rail.

4. The ceiling suspension system of claim 1, wherein at least one of the upper portions includes an indentation for engagement with a mounting bracket that is securable to the ceiling.

5. The ceiling suspension system of claim 1, wherein the vertical web further includes a second ridge, the second groove on the lower portions positioned to receive the second ridge.

6. The ceiling suspension system of claim 1, wherein the object is a ceiling tile or panel, the suspension rail further including a pair of ledges extending away from the vertical web for supporting the ceiling tile or panel.

7. A ceiling suspension system comprising:
a mounting bracket securable to the ceiling, the mounting bracket having a flange extending therefrom and an aperture extending through the flange;

a hanger comprising a first suspension member and a second suspension member positioned adjacent to one another, the first and second suspension members each having:
an upper portion,
a lower portion, and
a coupling component situated between the upper and lower portions,
the upper portions configured to be releasably suspended from the ceiling, the lower portions configured to releasably engage a suspension rail, and the coupling components engageable to form a hinge connection between the first and second suspension members;
wherein separation of the upper portions from one another biases the lower portions towards one another to releasably engage the suspension rail between the suspension members;
wherein the flange is releasably engagable between the upper portions, thereby separating the upper portions from one another and biasing the lower portions towards one another to releasably engage, and suspend, the suspension rail therefrom; and
wherein the ceiling suspension system further comprises a fastener directed through the aperture in the mounting bracket for securing the suspension members to the mounting bracket.

8. The suspension system of claim 7, wherein at least one of the upper portions includes a lip and the flange of the mounting bracket has an indentation for engagement with the lip of the least one of the upper portions.

9. A ceiling suspension system for suspending an object from a ceiling, the ceiling suspension system comprising:
a mounting bracket securable to the ceiling, the mounting bracket having a flange extending therefrom and an aperture extending through the flange;
a suspension rail configured to support the object, the suspension rail having a vertical web;
a first suspension member and a second suspension member positioned adjacent to one another, the first and second suspension member each having:
an upper portion,
a lower portion, and
a coupling component situated between the upper and lower portions,
the upper portions configured to be engagable with the flange of the mounting bracket for suspension therefrom, the lower portions configured to be engageable with the vertical web of the suspension rail for suspension therefrom, the coupling components being engageable to form a hinge connection between the first and second suspension members; and
a fastener directed through the aperture in the mounting bracket for securing the suspension members to the mounting bracket,
wherein engagement of the flange between the upper portions separates the upper portions from one another, thereby biasing the lower portions together to releasably engage the vertical web and suspend the suspension rail therefrom.

10. The ceiling suspension system of claim 9, wherein the flange of the mounting bracket has an indentation and at least one of the upper portions has a corresponding lip positioned to engage the indentation situated on the flange.

11. The ceiling suspension system of claim 10, wherein the mounting bracket includes an aperture extending through the flange towards the suspension members, the aperture dimensioned to receive the fastener therethrough for securing the suspension members to the mounting bracket.

12. The ceiling suspension system of claim 11, wherein the suspension rail further includes a first ridge situated on the vertical web and the lower portions have a first groove positioned to releasably engage the ridge on the suspension rail.

13. The ceiling suspension system of claim 12, wherein the lower portions have a second groove positioned between the first groove and the coupling components, the vertical web further having a second ridge positioned to engage with the second groove.

14. The ceiling suspension system of claim 13, wherein the hinge connection comprises a ball and a socket connection.

15. The ceiling suspension system of claim 14, wherein the object is a ceiling tile or panel, and the suspension rail further includes a pair of ledges at an end of the vertical web, the ledges extending away from the vertical web for supporting the ceiling tile or panel.

* * * * *